US011501714B2

(12) United States Patent
Park et al.

(10) Patent No.: US 11,501,714 B2
(45) Date of Patent: Nov. 15, 2022

(54) DISPLAY DEVICE AND DRIVING METHOD THEREOF

(71) Applicant: Samsung Display Co., Ltd., Yongin-si (KR)

(72) Inventors: Hyung Jun Park, Yongin-si (KR); Yang Wan Kim, Yongin-si (KR); Byung Sun Kim, Yongin-si (KR); Su Jin Lee, Yongin-si (KR); Jae Yong Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/944,477

(22) Filed: Jul. 31, 2020

(65) Prior Publication Data

US 2020/0365086 A1 Nov. 19, 2020

Related U.S. Application Data

(63) Continuation of application No. 15/989,634, filed on May 25, 2018, now Pat. No. 10,769,999.

(30) Foreign Application Priority Data

Oct. 16, 2017 (KR) ........................ 10-2017-0134035

(51) Int. Cl.
*G06F 3/01* (2006.01)
*G06F 3/041* (2006.01)
(Continued)

(52) U.S. Cl.
CPC ......... *G09G 3/3258* (2013.01); *G09G 3/2003* (2013.01); *G09G 3/3233* (2013.01);
(Continued)

(58) Field of Classification Search
None
See application file for complete search history.

(56) References Cited

U.S. PATENT DOCUMENTS 7,855,700 B2 * 12/2010 Kim .................... G09G 3/3233 345/44
8,018,405 B2 9/2011 Kwak et al.
(Continued)

FOREIGN PATENT DOCUMENTS

CN 1959790 5/2007
CN 104217675 12/2014
(Continued)

OTHER PUBLICATIONS

Extended European Search Report issued by the European Patent Application or Patent No. 18195311.8 dated Nov. 12, 2018.
(Continued)

*Primary Examiner* — Patrick N Edouard
*Assistant Examiner* — Peijie Shen
(74) *Attorney, Agent, or Firm* — Kile Park Reed & Houtteman PLLC

(57) ABSTRACT

A display device includes first and second initialization voltage sources and first and second pixel circuits. The first initialization voltage source provides a first initialization voltage. The second initialization voltage source provides a second initialization voltage less than the first initialization voltage. The first pixel circuit includes a first organic light emitting diode. The second pixel circuit includes a second organic light emitting diode with an organic material having a band gap different from a band gap of an organic material in the first organic light emitting diode. The first pixel circuit is coupled to the first initialization voltage source and the second initialization voltage source. The second pixel circuit is coupled to a single initialization voltage source.

12 Claims, 13 Drawing Sheets

(51) Int. Cl.

| | |
|---|---|
| ***G01S 13/06*** | (2006.01) |
| ***G06F 3/0488*** | (2022.01) |
| ***G09G 3/3258*** | (2016.01) |
| ***G09G 3/3233*** | (2016.01) |
| ***G09G 3/20*** | (2006.01) |

(52) U.S. Cl.
CPC ............... *G09G 2300/0452* (2013.01); *G09G 2300/0809* (2013.01); *G09G 2300/0819* (2013.01); *G09G 2300/0842* (2013.01); *G09G 2300/0861* (2013.01); *G09G 2310/0251* (2013.01); *G09G 2310/0262* (2013.01); *G09G 2320/0242* (2013.01)

(56) References Cited

U.S. PATENT DOCUMENTS

| | | | | |
|---|---|---|---|---|
| 9,208,727 | B2 | 12/2015 | Lee et al. | |
| 9,608,050 | B2 | 3/2017 | Jin | |
| 9,990,881 | B2 | 6/2018 | Kimura et al. | |
| 10,769,999 | B2 | 9/2020 | Park et al. | |
| 10,957,255 | B2 | 3/2021 | Ka et al. | |
| 11,233,096 | B2 * | 1/2022 | Huangfu | G02F 1/134345 |
| 2004/0108818 | A1 * | 6/2004 | Cok | G09G 3/3225 315/169.3 |
| 2004/0119669 | A1 | 6/2004 | Ishizuka et al. | |
| 2004/0178974 | A1 * | 9/2004 | Miller | H01L 27/3213 345/82 |
| 2005/0122296 | A1 | 6/2005 | Kubo et al. | |
| 2007/0103405 | A1 * | 5/2007 | Kwak | G09G 3/3291 345/76 |
| 2007/0152920 | A1 * | 7/2007 | Yamashita | G09G 3/3233 345/76 |
| 2008/0042943 | A1 | 2/2008 | Cok | |
| 2008/0074363 | A1 * | 3/2008 | Yamashita | G09G 3/3233 345/80 |
| 2008/0246785 | A1 | 10/2008 | Shirasaki et al. | |
| 2008/0308819 | A1 * | 12/2008 | Louwsma | H01L 27/322 257/89 |
| 2009/0207160 | A1 | 8/2009 | Shirasaki et al. | |
| 2010/0103206 | A1 | 4/2010 | Kamada et al. | |
| 2011/0037791 | A1 * | 2/2011 | Haas | G09G 3/325 345/690 |
| 2011/0080442 | A1 * | 4/2011 | Ghosh | G09G 3/2003 345/694 |
| 2011/0084955 | A1 | 4/2011 | Kim | |
| 2011/0199395 | A1 | 8/2011 | Nathan et al. | |
| 2011/0291083 | A1 | 12/2011 | Kim et al. | |
| 2012/0286653 | A1 | 11/2012 | Abe et al. | |
| 2013/0037827 | A1 | 2/2013 | Levermore et al. | |
| 2013/0135272 | A1 | 5/2013 | Park | |
| 2014/0028649 | A1 * | 1/2014 | Kim | G09G 3/3233 345/212 |
| 2014/0028859 | A1 * | 1/2014 | Kim | G09G 3/30 348/189 |
| 2014/0118409 | A1 * | 5/2014 | Jun | G09G 3/3233 345/690 |
| 2014/0132590 | A1 | 5/2014 | Inoue et al. | |
| 2014/0240521 | A1 * | 8/2014 | Kwak | H04N 17/004 348/189 |
| 2014/0253421 | A1 * | 9/2014 | Izumi | G09G 3/3225 345/87 |
| 2014/0306946 | A1 * | 10/2014 | Senda | H04N 13/341 345/212 |
| 2014/0333682 | A1 * | 11/2014 | Okuno | G09G 3/3233 345/80 |
| 2014/0375700 | A1 | 12/2014 | Takahama et al. | |
| 2015/0002378 | A1 | 1/2015 | Nathan et al. | |
| 2015/0009194 | A1 * | 1/2015 | Kim | G09G 3/3233 345/211 |
| 2015/0097872 | A1 | 4/2015 | Jeong et al. | |
| 2015/0161941 | A1 | 6/2015 | Lim et al. | |
| 2015/0279278 | A1 * | 10/2015 | Park | G09G 3/3233 345/212 |
| 2015/0371606 | A1 | 12/2015 | Lee | |
| 2016/0125798 | A1 | 5/2016 | Park et al. | |
| 2016/0125809 | A1 * | 5/2016 | Hwang | G09G 3/3258 345/212 |
| 2016/0155387 | A1 | 6/2016 | Kim et al. | |
| 2016/0189609 | A1 | 6/2016 | Seo et al. | |
| 2016/0240132 | A1 | 8/2016 | Takahiro | |
| 2016/0240138 | A1 * | 8/2016 | Xu | G09G 3/3258 |
| 2016/0293103 | A1 | 10/2016 | Kimura et al. | |
| 2016/0305394 | A1 | 10/2016 | Demmons | |
| 2016/0358547 | A1 * | 12/2016 | Zhu | G09G 3/3233 |
| 2017/0116922 | A1 | 4/2017 | Jung et al. | |
| 2017/0124941 | A1 | 5/2017 | Na et al. | |
| 2017/0148865 | A1 | 5/2017 | Cho et al. | |
| 2017/0150147 | A1 * | 5/2017 | Forsyth | H04N 19/593 |
| 2017/0169764 | A1 * | 6/2017 | Lee | G09G 3/3233 |
| 2017/0186375 | A1 * | 6/2017 | Jung | G09G 3/3233 |
| 2017/0249903 | A1 * | 8/2017 | Xiang | G09G 3/3266 |
| 2017/0365218 | A1 * | 12/2017 | Jeong | G09G 3/3225 |
| 2018/0174931 | A1 * | 6/2018 | Henley | G01R 31/2635 |
| 2019/0252644 | A1 * | 8/2019 | Kajimoto | G09F 9/30 |
| 2020/0227502 | A1 | 7/2020 | Song et al. | |
| 2021/0183315 | A1 | 6/2021 | Ka et al. | |

FOREIGN PATENT DOCUMENTS

| | | |
|---|---|---|
| CN | 112037715 | 10/2021 |
| KR | 10-0840116 | 6/2008 |
| KR | 10-1101070 | 12/2011 |
| KR | 10-2014-0134046 | 11/2014 |
| KR | 10-2015-0064543 | 6/2015 |
| KR | 10-2017-0066771 | 6/2017 |
| KR | 10-2017-0078916 | 7/2017 |
| KR | 10-2017-0143049 | 12/2017 |
| WO | 2012/157575 | 11/2012 |

OTHER PUBLICATIONS

Notice of Allowance from US Patent Office for U.S. Appl. No. 17/179,240 dated Sep. 2, 2022.

* cited by examiner

DISPLAY DEVICE AND DRIVING METHOD THEREOF

CROSS-REFERENCE TO RELATED APPLICATION(S)

This is a continuation application based on currently pending U.S. patent application Ser. No. 15/989,634, filed on May 25, 2018, the disclosure of which is incorporated herein by reference in its entirety. U.S. patent application Ser. No. 15/989,634 claims priority benefit of Korean Patent Application No. 10-2017-0134035, filed on Oct. 16, 2017 in the Korean Intellectual Property Office, the disclosure of which is incorporated herein by reference in its entirety for all purposes.

BACKGROUND

1. Field

One or more embodiments described herein relate to a display device and a method for driving a display device.

2. Description of the Related Art

A variety of displays have been developed. Examples include liquid crystal displays, organic light emitting displays, and plasma display panels. Organic light emitting displays generate images using pixels that emit light from organic light emitting diodes, and therefore have relatively high response speed and low power consumption.

In operation, an organic light emitting display generates a target image by writing data voltages in the pixels for expressing light of target gray scales values. The organic light emitting diodes may emit red, blue, and green light based on the different band gaps of organic materials in the organic light emitting diodes. The green organic light emitting diodes have high efficiency of emission luminance compared with energy consumption. As a result, the green organic light emitting diodes may have light emitting surfaces that are smaller than the light emitting surfaces of the organic light emitting diodes of other colors.

Also, the driving current flowing through the green organic light emitting diode may be set to have a smaller magnitude than the driving currents flowing through the other color organic light emitting diodes.

However, it may take a long time to charge the capacitors of the green organic light emitting diodes under low-luminance conditions, e.g., where the magnitudes of the driving currents are small. As a result, a color dragging phenomenon may occur where the green organic light emitting diodes emit light later in time than organic light emitting diodes of other colors.

SUMMARY

In accordance with one or more embodiments, a display device includes a first initialization voltage source to provide a first initialization voltage; a second initialization voltage source to provide a second initialization voltage less than the first initialization voltage; a first pixel circuit including a first organic light emitting diode; and a second pixel circuit including a second organic light emitting diode that includes an organic material having a band gap different from a band gap of an organic material in the first organic light emitting diode, wherein the first pixel circuit is coupled to the first initialization voltage source and the second initialization voltage source and wherein the second pixel circuit is coupled to a single initialization voltage source.

The second organic light emitting diode may have a greater capacitance per unit area than the first organic light emitting diode. An area of a light emitting surface of the second organic light emitting diode may be less than an area of a light emitting surface of the first organic light emitting diode. The single initialization voltage source may be the first initialization voltage source.

The first pixel circuit may include a first driving transistor with an end coupled to an anode of the first organic light emitting diode in an emission period, the second pixel circuit may include a second driving transistor with an end coupled to an anode of the second organic light emitting diode in an emission period, and the first initialization voltage source may be coupled to a gate terminal of the first driving transistor and a gate terminal of the second driving transistor in a first initialization period.

The second initialization voltage source may be coupled to the anode of the first organic light emitting diode in a second initialization period, and the first initialization voltage source may be coupled to the anode of the second organic light emitting diode in the second initialization period. The single initialization voltage source may be the second initialization voltage source.

The second initialization voltage source may be coupled to the anode of the first organic light emitting diode and the anode of the second organic light emitting diode in the second initialization period. The first pixel circuit may include a first driving transistor having an end coupled to the anode of the first organic light emitting diode in an emission period, the second pixel circuit may include a second driving transistor having an end coupled to the anode of the second organic light emitting diode in an emission period, the first initialization voltage source may be coupled to a gate terminal of the first driving transistor in a first initialization period, and the second initialization voltage source may be coupled to a gate terminal of the second driving transistor in the first initialization period. The first initialization period may be before the second initialization period.

The display device may include a third initialization voltage source to provide a third initialization voltage having a voltage value different from a voltage value of the first initialization voltage and the second initialization voltage, wherein the single initialization voltage source is the third initialization voltage source. The third initialization voltage may have a value between the first initialization voltage and the second initialization voltage.

The second initialization voltage source may be coupled to the anode of the first organic light emitting diode in a second initialization period, and the third initialization voltage source may be coupled to the anode electrode of the second organic light emitting diode in the second initialization period. The first pixel circuit may include a first driving transistor having an end coupled to the anode of the first organic light emitting diode in an emission period, the second pixel circuit may include a second driving transistor having an end coupled to the anode of the second organic light emitting diode in an emission period, the first initialization voltage source may be coupled to a gate terminal of the first driving transistor in a first initialization period, and the third initialization voltage source may be coupled to a gate terminal of the second driving transistor in the first initialization period.

The display device may include a third pixel circuit coupled to the first initialization voltage source and the second initialization voltage source, the third pixel circuit including an organic material having a band gap different from bang gaps of the organic materials in the first organic light emitting diode and the second organic light emitting diode; a first data line; and a second data line different from the first data line, wherein the first pixel circuit and the third pixel circuit are coupled to the first data line and wherein the second pixel circuit is coupled to the second data line.

The first organic light emitting diode may be a red organic light emitting diode, the second organic light emitting diode may be a green organic light emitting diode, and the third organic light emitting diode may be a blue organic light emitting diode. The first organic light emitting diode may be a red organic light emitting diode, the second organic light emitting diode may be a blue organic light emitting diode, and the third organic light emitting diode may be a green organic light emitting diode. The first organic light emitting diode may be a blue organic light emitting diode, the second organic light emitting diode may be a red organic light emitting diode, and the third organic light emitting diode may be a green organic light emitting diode.

The third pixel circuit may include a third driving transistor having an end coupled to an anode of the third organic light emitting diode in an emission period, the first initialization voltage source may be coupled to a gate terminal of the third driving transistor in a first initialization period, and the second initialization voltage source may be coupled to the anode of the third organic light emitting diode in a second initialization period.

In accordance with one or more other embodiments, a method for driving a display device includes, in a first initialization period, applying a first initialization voltage to a gate terminal of a first driving transistor of a first pixel circuit and applying a single initialization voltage to a gate terminal of a second driving transistor of a second pixel circuit; in a second initialization period, applying a second initialization voltage less than the first initialization voltage to an anode of a first organic light emitting diode of the first pixel circuit and applying the single initialization voltage to an anode of a second organic light emitting diode of the second pixel circuit, which includes an organic material having a band gap different from a band gap of an organic material of the first organic light emitting diode; and in an emission period, allowing the first organic light emitting diode and the second organic light emitting diode to emit light.

The single initialization voltage may be equal to the first initialization voltage. The single initialization voltage may be equal to the second initialization voltage. The single initialization voltage may have a value different from values of the first initialization voltage and the second initialization voltage. The single initialization voltage may have a value between the first initialization voltage and the second initialization voltage.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
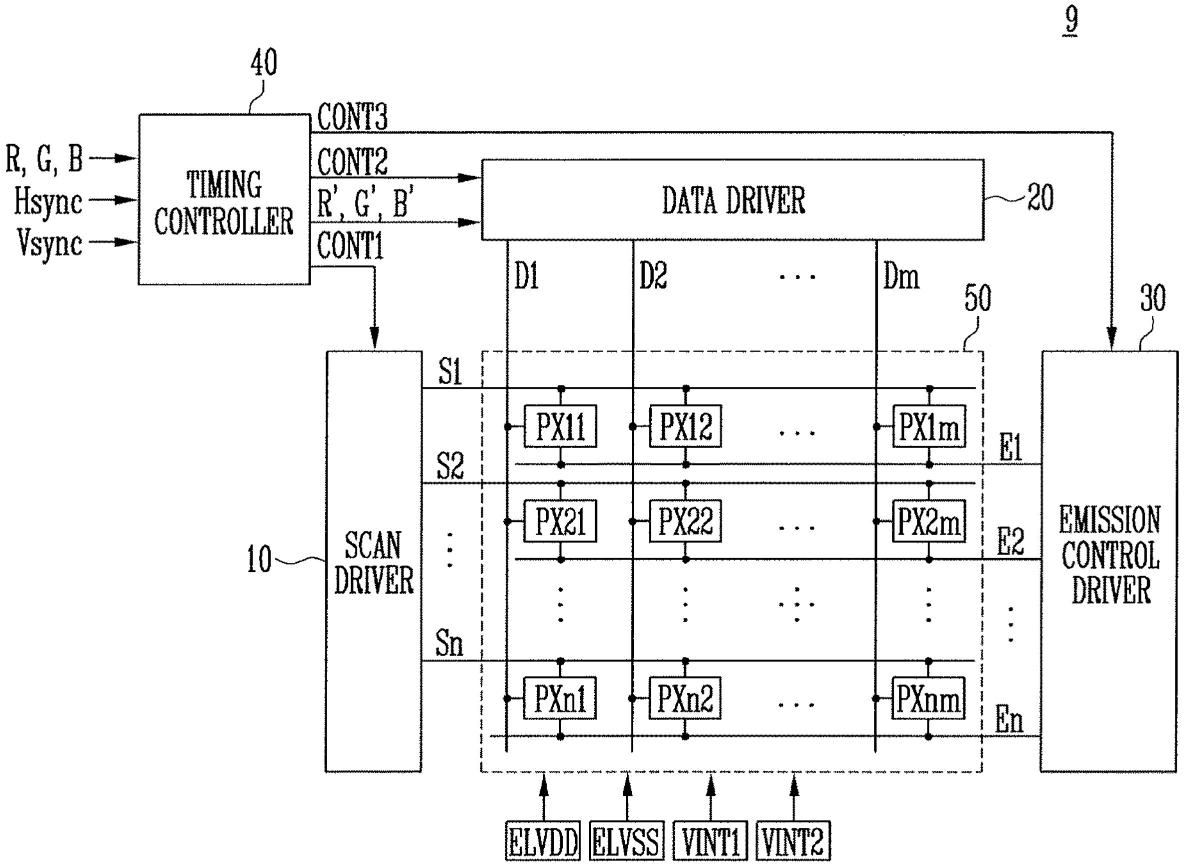
FIG. 1 illustrates an embodiment of a display device.

Example embodiments are described with reference to the drawings; however, they may be embodied in different forms and should not be construed as limited to the embodiments set forth herein. Rather, these embodiments are provided so that this disclosure will be thorough and complete, and will convey exemplary implementations to those skilled in the art. The embodiments (or portions thereof) may be combined to form additional embodiments In the drawings, the dimensions of layers and regions may be exaggerated for clarity of illustration. It will also be understood that when a layer or element is referred to as being “on” another layer or substrate, it can be directly on the other layer or substrate, or intervening layers may also be present. Further, it will be understood that when a layer is referred to as being “under” another layer, it can be directly under, and one or more intervening layers may also be present. In addition, it will also be understood that when a layer is referred to as being “between” two layers, it can be the only layer between the two layers, or one or more intervening layers may also be present. Like reference numerals refer to like elements throughout.

When an element is referred to as being “connected” or “coupled” to another element, it can be directly connected or coupled to the another element or be indirectly connected or coupled to the another element with one or more intervening elements interposed therebetween. In addition, when an element is referred to as “including” a component, this indicates that the element may further include another component instead of excluding another component unless there is different disclosure.

FIG. 1 illustrates an embodiment of a display device 9 which includes a timing controller 40, a scan driver 10, a data driver 20, an emission control driver 30, and a pixel unit 50.

The timing controller 40 supplies a control signal CONT1 to the scan driver 10, a control signal CONT3 to the emission control driver 30, and a control signal CONT2 and image signals R', G', and B' to the data driver 20. This may be accomplished by converting a control signal and image signals R, G, and B, which are supplied from an external source, to a form suitable for specifications of the display device 9. The control signal received by the timing controller 40 may include, for example, a horizontal synchronization signal Hsync and a vertical synchronization signal Vsync.

The scan driver 10 generates a scan signal, to be supplied to a plurality of scan lines S1, S2, . . . , and Sn, based on the control signal CONT1. In an embodiment, the scan driver 10 may sequentially supply a scan signal to the plurality of scan lines S1, S2, . . . , and Sn. The control signal CONT1 may include, for example, a gate start pulse GSP and a plurality of gate cock signals. The scan driver 10 may include a shift register to generate a scan signal in a manner that sequentially transfers the gate start pulse to a next stage circuit under the control of the gate clock signal.

The data driver 20 generates data voltages, to be supplied to a plurality of data lines D1, D2, . . . , and Dm, based on the control signal CONT2 and the image signal R', G', and B'. The data voltages may be generated in units of pixel rows and may be simultaneously applied to the plurality of data lines D1, D2, . . . , and Dm according to an output control signal in the control signal CONT2.

The pixel unit 50 may include a plurality of pixel circuits PX11, PX12, . . . , PX1*m*, PX21, PX22, . . . , PX2*m*, PXn1, PXn2, . . . , and PXnm. Each pixel circuit may be coupled to a corresponding data line and a corresponding scan line, and may receive a data voltage input corresponding to a scan signal. Each pixel circuit allows an organic light emitting diode to emit light based on the input data voltage.

The emission control driver 30 may supply an emission control signal for determining emission periods of the plurality of pixel circuits PX11, PX12, . . . , PX1*m*, PX21, PX22, . . . , PX2*m*, PXn1, PXn2, . . . , and PXnm to emission control lines E1, E2, . . . , and En. For example, each pixel circuit may include an emission control transistor. The flow of current through the organic light emitting diode may be determined according to on/off of the emission control transistor, so that the emission of the organic light emitting diode is controlled.

The display device 9 may include a plurality of voltage sources ELVDD, ELVSS, VINT1, and VINT2. In the embodiment of FIG. 1, the plurality of voltage sources ELVDD, ELVSS, VINT1, and VINT2 are at a lower end of the pixel unit 50. In one embodiment, the plurality of voltage sources ELVDD, ELVSS, VINT1, and VINT2 may be at an upper end of the pixel unit 50. For example, the plurality of voltage sources ELVDD, ELVSS, VINT1, and VINT2 may be adjacent to the data driver 20.

A voltage source ELVDD may be electrically coupled to an anode electrode of each organic light emitting diode. A voltage source ELVSS may be electrically coupled to a cathode of each organic light emitting diode, to provide a driving current for light emission. The voltage of the voltage source ELVDD may be greater than the voltage of the voltage source ELVSS.

A first initialization voltage source VINT1 provides a first initialization voltage. A second initialization voltage source VINT2 provides a second initialization voltage less than the first initialization voltage. In an embodiment, configurations of first and second pixel circuits coupled to the initialization voltage sources VINT1 and VINT2 may be distinguished from each other. An example will be described with reference to the following drawings from FIG. 4.

Figure 2:
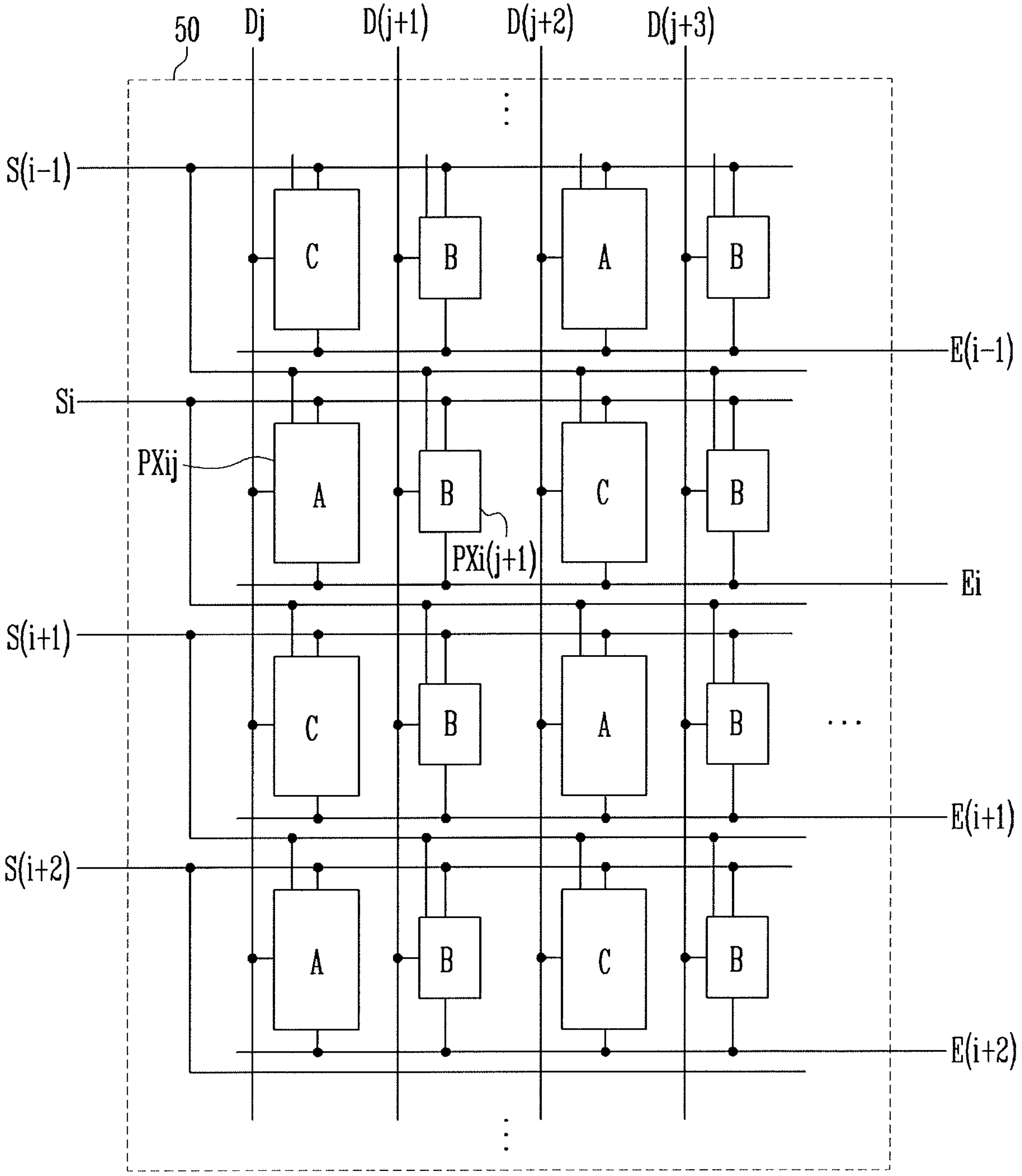
FIG. 2 illustrates an embodiment of a pixel unit.

FIG. 2 illustrates an embodiment of a pixel unit, which, for example, may correspond to the pixel unit 50 in FIG. 1. The pixel unit 50 may include a first pixel circuit A, a second pixel circuit B, and a third pixel circuit C.

The first pixel circuit A may include a first driving transistor and a first organic light emitting diode. The second pixel circuit B may include a second driving transistor and a second organic light emitting diode. The third pixel circuit C may include a third driving transistor and a third organic light emitting diode.

In one embodiment, the second organic light emitting diode may include an organic material having a high emission luminance, e.g., a high emission efficiency, compared with energy consumption. Therefore, the second organic light emitting diode may have a light emitting surface with a smaller area than a light emitting surface of the first or third organic light emitting diode. Accordingly, a case where the second pixel circuit B has a smaller area than the first or third organic light emitting diode is illustrated in FIG. 2.

A green organic light emitting diode may have the highest emission luminance compared with energy consumption. Therefore, the second organic light emitting diode may be, for example, the green organic light emitting diode. In this case, the first and third organic light emitting diodes may be red and blue organic light emitting diodes, respectively. In another case, the first and third organic light emitting diodes may be blue and red organic light emitting diodes, respectively.

In one embodiment, a new organic material having a high emission efficiency may be developed, and therefore the second organic light emitting diode may be a blue organic light emitting diode. In this case, the first and third organic light emitting diodes may be red and green organic light emitting diodes, respectively. In another case, the first and third organic light emitting diodes may be green and red organic light emitting diodes, respectively.

The second organic light emitting diode may be, for example, a red organic light emitting diode. In this case, the first and third organic light emitting diodes may be blue and green organic light emitting diodes, respectively. In another case, the first and third organic light emitting diodes may be green and blue organic light emitting diodes, respectively.

In one embodiment, the second organic light emitting diode may not be determined according to emission efficiency. Referring to FIG. 2, the sum of the number of first pixel circuits A and the number of third pixel circuits C may be equal to the number of second pixel circuits B. When emission efficiencies of organic materials are similar to one another, the areas of the light emitting surfaces of FIG. 2 may be determined to control the emission area of each color pixel.

In an embodiment, the display device 9 may include a plurality of data lines which include first data lines Dj, D(j+2), . . . and second data lines D(j+1), D(j+3), . . . . The first data lines Dj, D(j+2), . . . and the second data lines D(j+1), D(j+3), . . . are different data lines and may be alternately disposed. For example, the first data lines Dj, D(j+2), . . . may be odd-numbered data lines, and the second data lines D(j+1), D(j+3), . . . may be even-numbered data lines.

The first pixel circuit A and the third pixel circuit C may be coupled to the first data lines Dj, D(j+2), . . . . The second pixel circuit B may be coupled to the second data lines D(j+1), D(j+3), . . . .

In the pixel unit 50 of FIG. 2, a scan line of a previous stage is input to each pixel circuit of a current stage. For example, a scan line S(i−1) of the previous stage is coupled to each of the pixel circuits A, B, and C coupled to a scan line Si of the current stage. In an embodiment, a signal applied to the scan line of the previous stage may be used as a first initialization signal for the pixel circuit of the current stage. An example of a coupling relationship regarding this will be described with reference to FIG. 4.

The signal used as the first initialization signal may be a signal applied to a scan line of a stage prior to the previous stage. A dedicated initialization line may separately exist regardless of the scan line. Therefore, in one embodiment, the scan line of the previous stage may not be input to each pixel circuit of the current stage. The structure of the pixel unit 50 shown in FIG. 2 may be referred to as a pentile structure.

Figure 3:
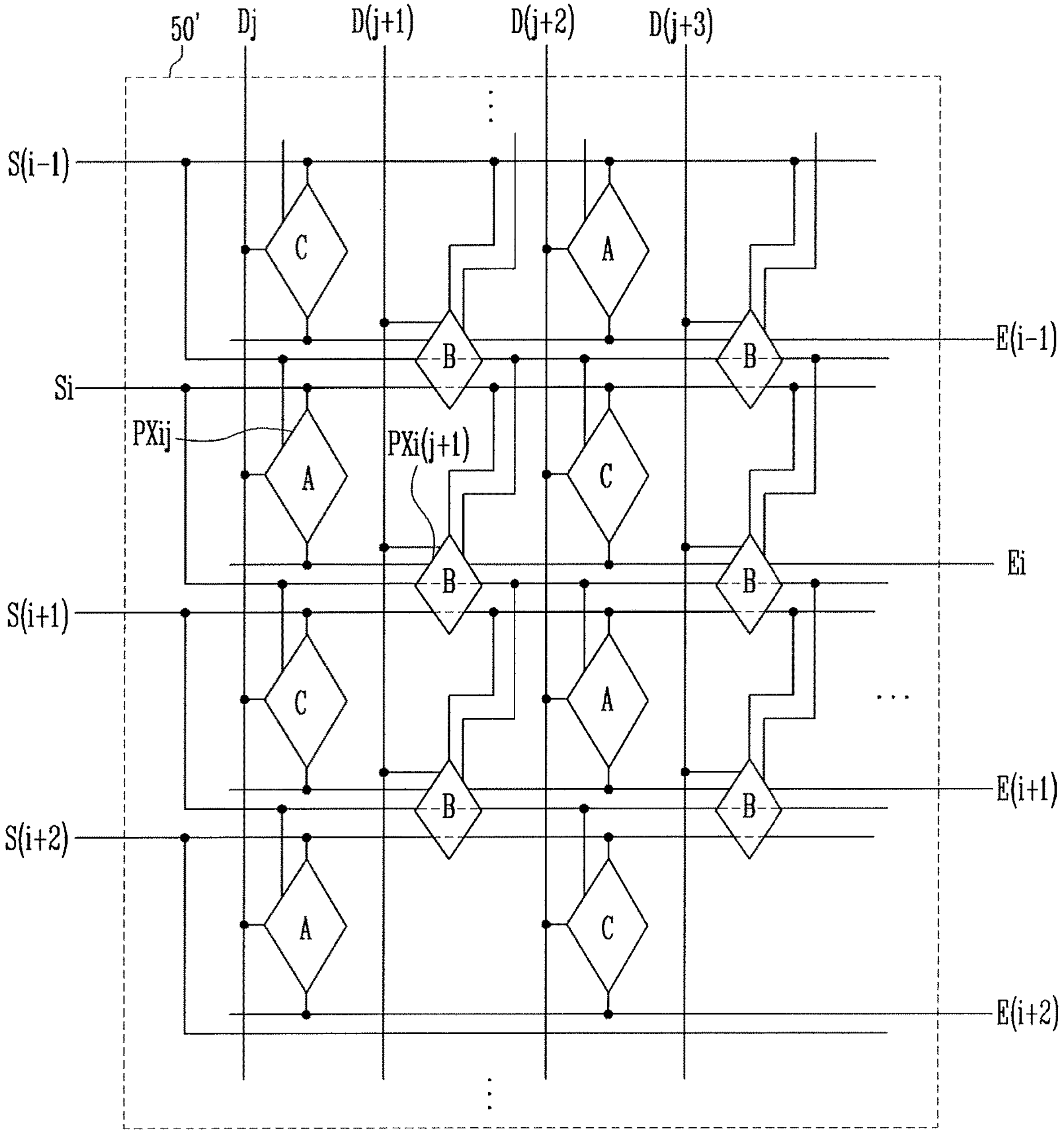
FIG. 3 illustrates another embodiment of a pixel unit

FIG. 3 illustrates another embodiment of a pixel unit 50', which may be identical to the pixel unit 50 of FIG. 2 in terms of the electrical coupling relationship and configuration of pixel circuits. Unlike the pixel unit 50 of FIG. 2, the light emitting surface of each pixel circuit in the pixel unit 50' of FIG. 3 may have a different shape, e.g., a diamond shape or a rhombus shape. The structure of the pixel unit 50' of FIG. 3 may be referred to as a diamond pentile structure.

Figure 4:
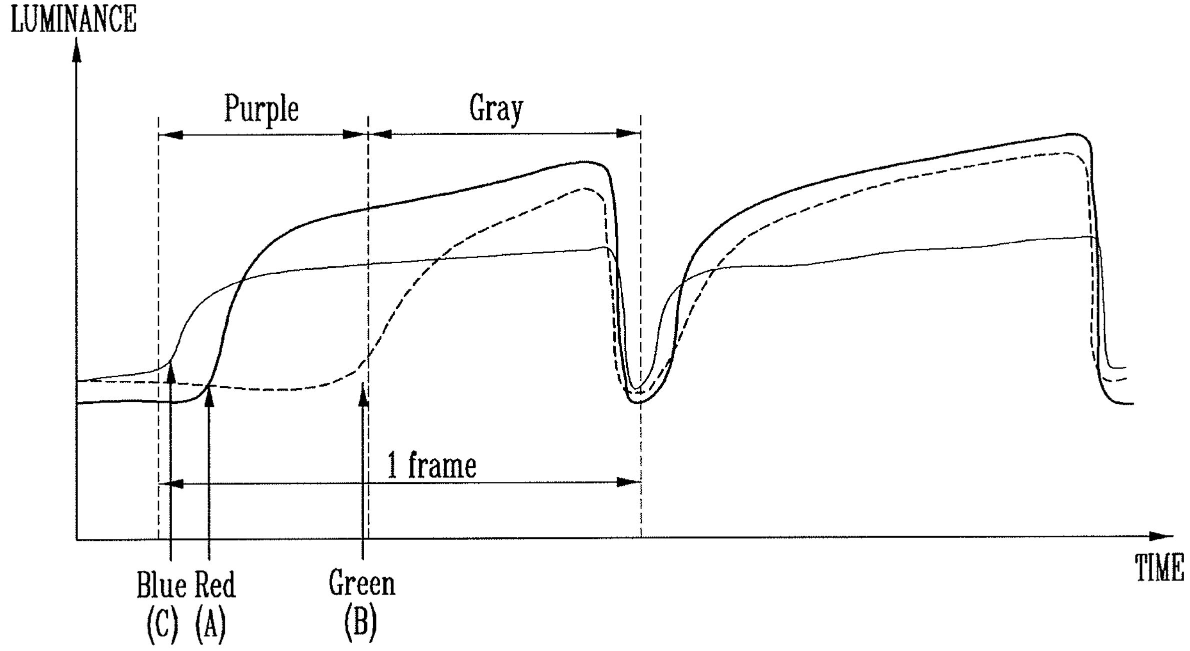
FIG. 4 illustrates an example of differences in emission times between pixels.

FIG. 4 illustrates an example of differences in emission times between pixels. Referring to FIG. 4, when the embodiment of the present disclosure is not applied, differences in emission time between pixels are illustrated. For example, in order to express gray scale values, light emitted from the first organic light emitting diode of the first pixel circuit A, the second organic light emitting diode of the second pixel circuit B, and the third organic light emitting diode of the third pixel circuit C may be combined when the luminance of each light reaches a certain level.

However, in the structures of the pixel units 50 and 50' shown in FIGS. 2 and 3, the capacitance of the second organic light emitting diode of the second pixel circuit B per unit area may be large and the amount of driving current flowing through the second organic light emitting diode of the second pixel circuit B may be small. Therefore, as shown in FIG. 4, the emission time of the second organic light emitting diode may be later than the emission times of the first and third organic light emitting diodes.

Therefore, only the first organic light emitting diode of the first pixel circuit A and the third organic light emitting diode of the third pixel circuit C may emit light at an initial period. When the first organic light emitting diode is a red organic light emitting diode and the third organic light emitting diode is a blue organic light emitting diode, the color perceived by a user may be purple. Therefore, the user may experience a phenomenon where purple is first viewed when the user scrolls a gray screen.

Figure 5:
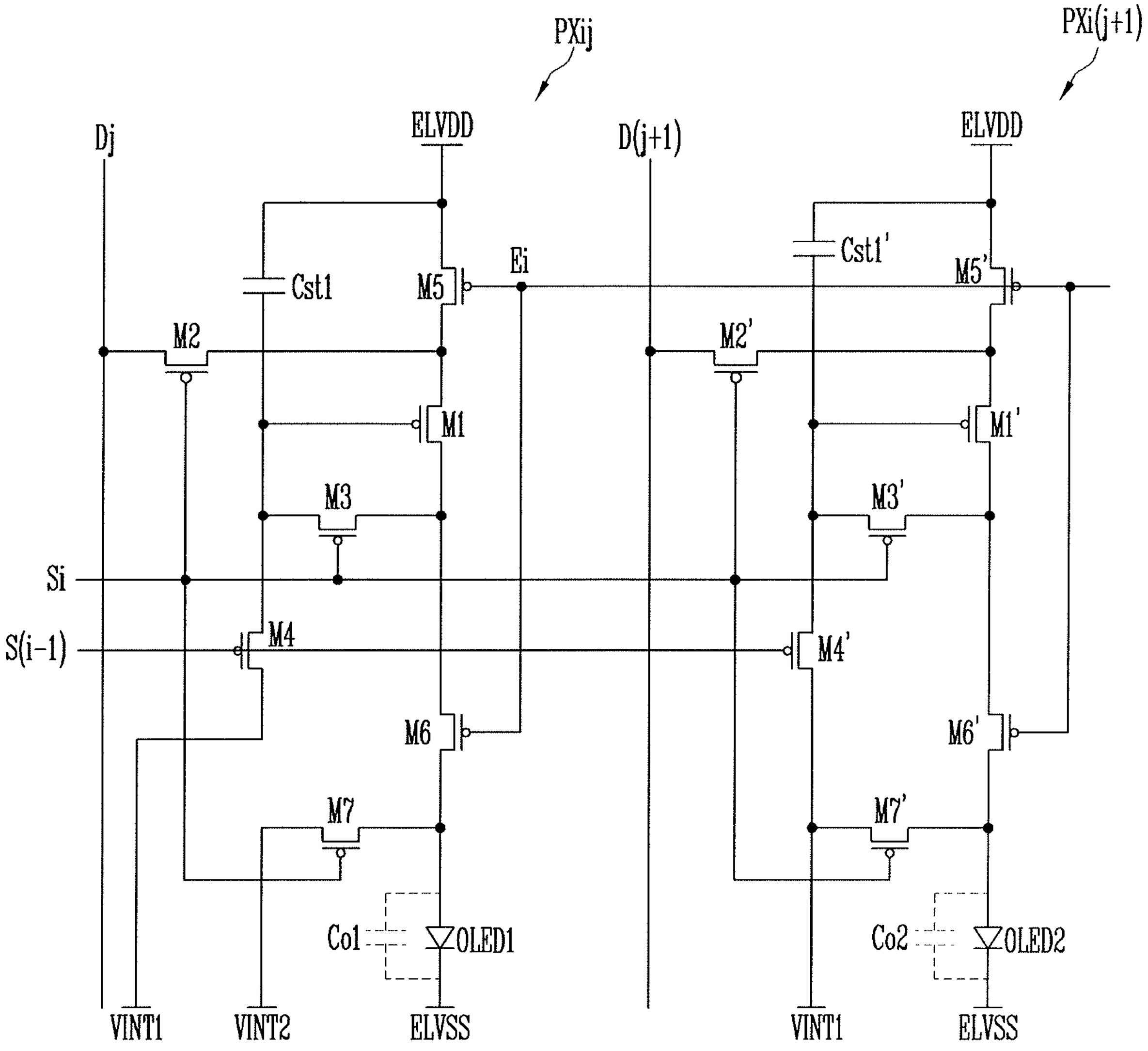
FIG. 5 illustrates another embodiment of a pixel circuit.

FIG. 5 illustrates another embodiment of a pixel circuit, which in this example includes a P-type transistor. In another embodiment, the pixel circuit may include an N-type transistor and the polarity of a voltage applied to a gate terminal thereof may be changed, e.g., inverted. In one embodiment, the pixel circuit may include a combination of P-type and N-type transistors.

In a P-type transistor, the amount of current flowing therethrough increases when the difference in voltage between a gate terminal and a source terminal increases in a negative direction. In a N-type transistor, the amount of current flowing therethrough increases when the difference in voltage between a gate terminal and a source terminal increases in a positive direction. The transistor may be, for example, a thin film transistor (TFT), a field effect transistor (FET), or a bipolar junction transistor (BJT).

Referring to FIG. 5, a first pixel circuit PXij may include a plurality of transistors M1, M2, M3, M4, M5, M6, and M7, a storage capacitor Cst1, and a first organic light emitting diode OLED1. The first pixel circuit PXij may correspond to the first pixel circuit A as illustrated in FIGS. 2 and 3.

The first pixel circuit PXij may be coupled to a first initialization voltage source VINT1 and a second initialization voltage source VINT2. As described above, a first initialization voltage of the first initialization voltage source VINT1 is greater than a second initialization voltage of the second initialization voltage source VINT2. For example, when the first initialization voltage is −2 V, the second initialization voltage may be −5 V.

Referring to FIG. 5, a second pixel circuit PXi(j+1) may include a plurality of transistors M1', M2', M3', M4', M5', M6', and M7', a storage capacitor Cst1', and a second organic light emitting diode OLED2. The second pixel circuit PXi(j+1) may correspond to the second pixel circuit B as illustrated in FIGS. 2 and 3.

The second pixel circuit PXi(j+1) may be coupled to a single initialization voltage source. An example where the single initialization voltage source is the first initialization voltage source is illustrated in FIG. 5. An example where the single initialization voltage source is the second initialization voltage source and an example where the single initialization voltage source is a third initialization voltage source are described with reference to FIGS. 7 and 10, respectively. First, the structure of the first pixel circuit PXij will be described.

The transistor M1 may have one end coupled to an end of the transistor M6, another end coupled to one end of the transistor M5, and a gate electrode coupled to one end of the storage capacitor Cst. The transistor M1 may serve as a first driving transistor.

The transistor M2 may have one end coupled to a first data line Dj, another end coupled to an end of the transistor M1, and a gate electrode of the transistor M2 may be coupled to a scan line Si of a current stage.

The transistor M3 may have one end coupled to the gate electrode of the transistor M1, another end coupled to one end of the transistor M1, and a gate terminal coupled to the scan line Si of the current stage.

The transistor M4 may have one end coupled to the first initialization voltage source VINT1, another end coupled to the gate terminal of the driving transistor M1, and a gate terminal coupled to a scan line S(i−1) of a previous stage.

The transistor M5 may have one end be coupled to an end of the transistor M1, another end coupled to a voltage source ELVDD, and a gate electrode coupled to an emission control line Ei. The transistor M5 may serve as an emission control transistor.

The transistor M6 may have one end coupled to an anode of the first organic light emitting diode OLED1, another end coupled to an end of the transistor M1, and a gate terminal coupled to the emission control line Ei. The transistor M6 may serve as an emission control transistor.

The transistor M7 may have one end coupled to the second initialization voltage source VINT2, another end coupled to the anode of the first organic light emitting diode OLED, and a gate terminal coupled to the scan line Si of the current stage.

The storage capacitor Cst may have one end coupled to the gate terminal of the transistor M1 and another end of the storage capacitor Cst coupled to the voltage source ELVDD.

The first organic light emitting diode OLED1 may have an anode coupled to the other end of the transistor M7 and a cathode coupled to a voltage source ELVSS. The first organic light emitting diode OLED1 may have a capacitor Co1, and the emission time of the first organic light emitting diode OLED1 may be determined according to the magnitude of the capacitor Co1 and the magnitude of driving current.

The coupling structure of the plurality of transistors M1', M2', M3', M4', M5', M6', and M7', the storage capacitor Cst1', and the second organic light emitting diode OLED2 in the second pixel circuit PXi(j+1) may correspond to that of the plurality of transistors M1, M2, M3, M4, M5, M6, and M7, the storage capacitor Cst1, and the first organic light emitting diode OLED1 in the first pixel circuit PXij. The transistor M1' may serve as a second driving transistor. The second organic light emitting diode OLED2 may include an organic material with a band gap different from the band gap of an organic material in the first organic light emitting diode OLED1.

The transistor M2' has one end coupled to a second data line D(j+1). Thus, even though the transistor M2' is turned on by the same scan signal as the transistor M2, the transistor M2' may be supplied with a data voltage different that of the transistor M2.

The transistor M7' has one end coupled to the first initialization voltage source VINT1. As described above, the first initialization voltage of the first initialization voltage source VINT1 is greater than the second initialization voltage of the second initialization voltage source VINT2. In addition, the voltage of the voltage source ELVSS may be less than the first and second initialization voltages. The capacitor Co1 of the first organic light emitting diode OLED1 is initialized to a voltage corresponding to the difference in voltage between the second initialization voltage source VINT2 and the voltage source ELVSS during a second initialization period.

On the other hand, a capacitor Co2 of the second organic light emitting diode OLED2 is initialized to a voltage corresponding to the difference in voltage between the first initialization voltage source VINT1 and the voltage source ELVSS during the second initialization period. Thus, the capacitor Co2 of the second organic light emitting diode OLED2 may be pre-charged with a voltage greater than that of the capacitor Co1. As a result, the emission time of the second organic light emitting diode OLED may be brought forward.

In the embodiment of FIG. 5, voltage sources applied to the gate terminals of the respective driving transistor M1 and M1' in a first initialization period may be the same as the first initialization voltage source VINT1. As a result, the effect caused by the driving transistors M1 and M1' is not changed.

Even though only the first pixel circuit PXij and the second pixel circuit PXi(j+1) are illustrated in FIG. 5, the structure of a third pixel circuit may be substantially identical to that of the first pixel circuit PXij, except that the third pixel circuit has a third organic light emitting diode. For example, when the first organic light emitting diode OLED1 is a red organic light emitting diode, the third organic light emitting diode may be a blue organic light emitting diode. When the first organic light emitting diode OLED1 is a blue organic light emitting diode, the third organic light emitting diode may be a red organic light emitting diode.

The third pixel circuit may include the third organic light emitting diode coupled to the first initialization voltage source VINT1 and the second initialization voltage source VINT2. The third organic light emitting diode may include an organic material having a band gap different from the band gaps of organic materials in the first organic light emitting diode OLED1 and the second organic light emitting diode OLED2. The third pixel circuit may be coupled to the first data line Dj. Also, the third pixel circuit may include a third driving transistor having one end coupled to an anode of the third organic light emitting diode during an emission period thereof. The first initialization voltage source may be coupled to a gate terminal of the third driving transistor in the first initialization period. The second initialization voltage source may be coupled to the anode of the third organic light emitting diode in the second initialization period.

Figure 6:
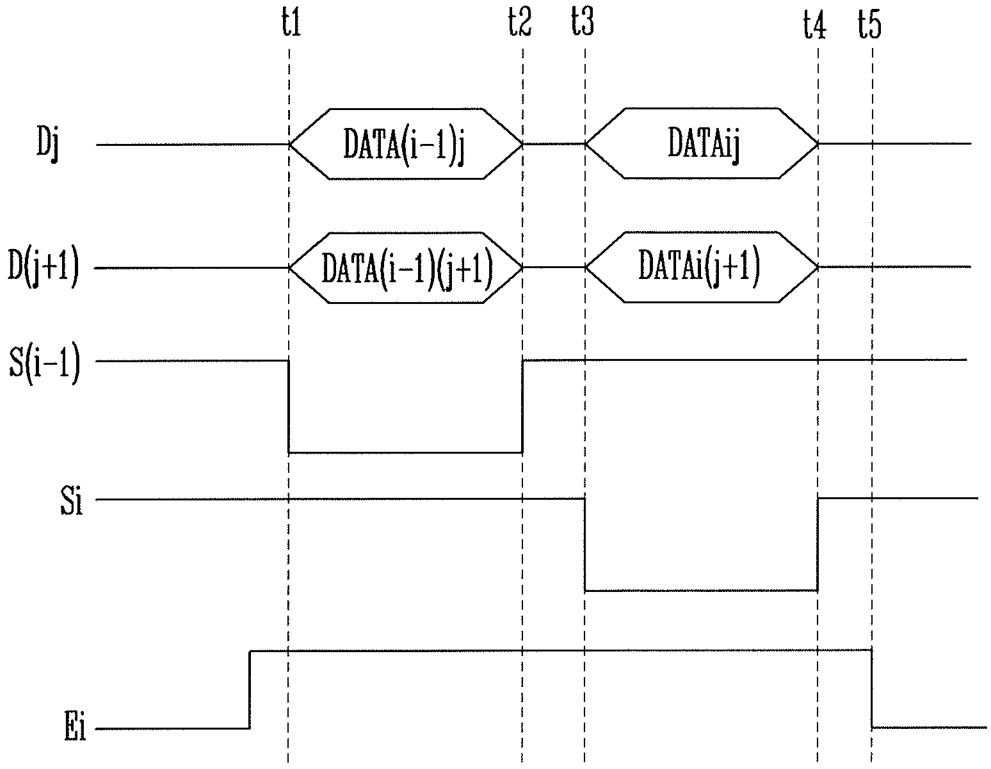
FIG. 6 illustrates an embodiment of a method for driving a pixel circuit.

FIG. 6 illustrates an embodiment of a method for driving the pixel circuit of FIG. 5. At time t1, a data voltage DATA(i−1)j of the previous stage is supplied through the first data line Dj, and a data voltage DATA(i−1)(j+1) is supplied through the second data lines D(j+1). At this time, a low-level scan signal of the previous stage is applied to the scan line S(i−1) of the previous stage, and the transistors M4 and M4' are turned on.

Therefore, the first initialization voltage source VINT1 is coupled to the gate terminal of the first driving transistor M1 and the gate terminal of the second driving transistor M1', and the gate voltage of each of the driving transistors M1 and M1' is initialized. The period between the time t1 and a time t2 may serve as a first initialization period. The other transistors except the transistors M1 and M1' may be in a turn-off state during the first initialization period.

At time t2, a high-level scan signal of the previous stage is applied to the scan line S(i−1) of the previous stage, and the transistors M1 and M1' are in the turn-off state. The initialized gate voltages of the transistors M1 and M1' are maintained by the storage capacitors Cst1 and Cst1', respectively.

At a time t3, a data voltage DATAij of the current stage is supplied through the first data line Dj, and a data voltage DATAi(j+1) of the current stage is supplied through the second data line D(j+1). At this time, a low-level scan signal of the current stage is supplied to the scan line Si of the current stage, and the transistors M2, M3, M7, M2', M3', and M7' are turned on.

As the transistors M3 and M3' are turned on, each of the driving transistors M1 and M1' is diode-coupled. A voltage corresponding to the data voltage DATAij of the current stage is input to the gate terminal of the first driving transistor M1 through the transistors M2, M1, and M3. In addition, a voltage corresponding to the data voltage DATAi (j+1) of the current stage is input to the gate terminal of the second driving transistor M1' through the transistors M2', M1', and M3'.

When the transistor M7 is turned on, the second initialization voltage source VINT2 is coupled to the anode of the first organic light emitting diode OLED1. In addition, when the transistor M7' is turned on, the first initialization voltage source VINT1 is coupled to the anode of the second organic light emitting diode OLED2. As described above, the capacitor Co2 of the second organic light emitting diode OLED2 is pre-charged with a voltage greater than that of the capacitance Co1 of the first organic light emitting diode OLED1.

The period between time t3 and time t4 may include a data input period and a second initialization period. Since the transistors M6 and M6' are turned off during this period, a voltage for input data and a voltage for initialization are separated to have no influence on each other. However, in this embodiment, the second initialization period and the data input period are set equal to each other and the second initialization period may be variously set, such as that the scan line S(i−1) of the previous scan line is coupled to the transistors M7 and M7'.

At time t4, the transistors M2, M3, M7, M2', M3', and M7' are turned off. The storage capacitors Cst1 and Cst1' maintain the voltages that have been applied to the gate terminals of the driving transistors M1 and M2', respectively.

At time t5, a low-level voltage is applied to the emission control line Ei, and the transistors M5, M6, M5', and M6' are turned on. Therefore, a current path is formed from the voltage source ELVDD to the voltage source ELVSS, and the magnitude of a driving current is determined according to the difference between gate and source voltages of each of the driving transistors M1 and M1'.

The emission times of the organic light emitting diodes OLED1 and OLED2 may be determined based on the magnitudes of driving currents and the magnitudes of the capacitors Co1 and Co2, respectively. As described above, since the capacitor Co2 of the second organic light emitting diode OLED2 is pre-charged with a voltage greater than that of the capacitance Co1 of the first organic light emitting diode OLED1, the emission time of the second organic light emitting diode OLED2 may be brought forward. As a result, the color dragging phenomenon described with reference to FIG. 3 may be removed. The period from time t5 to a time when a high-level voltage is applied to the emission control line Ei may serve as an emission period.

Figure 7:
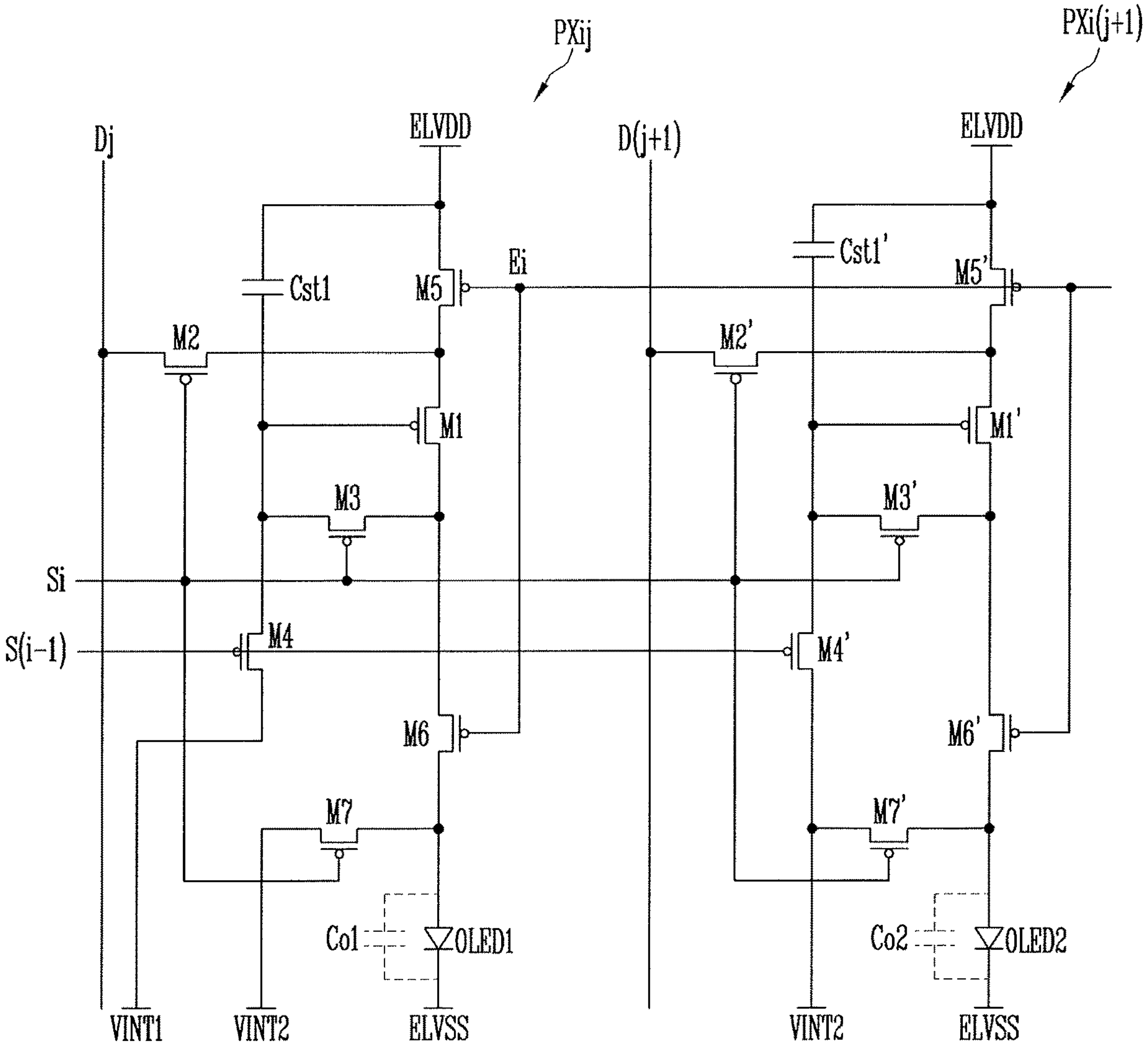
FIG. 7 illustrates an embodiment where the coupling configuration of an initialization voltage source is changed.
Figure 8:
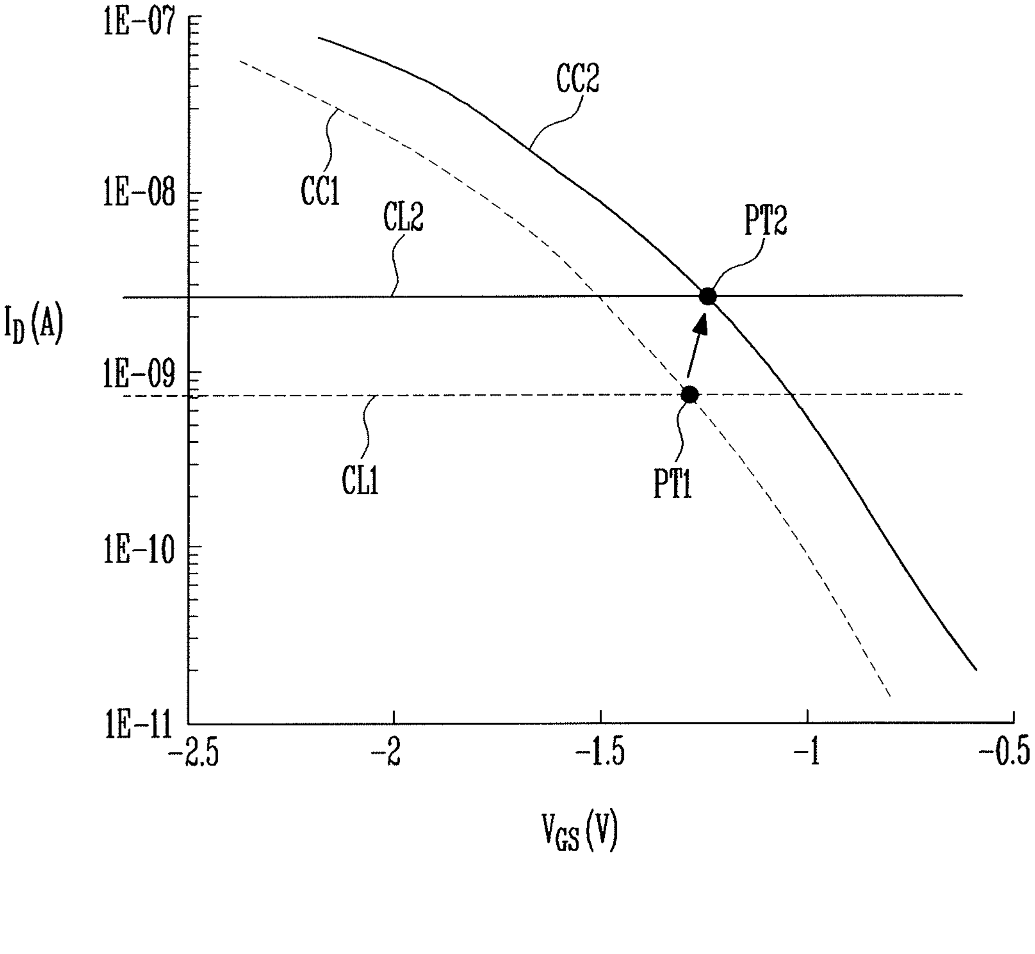
FIG. 8 illustrates an example of an effect where current increases according to the configuration of FIG. 7.

FIG. 7 illustrates an embodiment where the coupling configuration of an initialization voltage source is changed in the pixel circuit of FIG. 5. FIG. 8 illustrates an example of an effect where current increases according to the configuration of FIG. 7.

When comparing FIG. 7 with FIG. 5, the configuration of the first pixel circuit PXij of FIG. 7 is identical to that of the first pixel circuit PXij of FIG. 5. However, the configuration of the second pixel circuit PXi(j+1) of FIG. 7 is different from that of the second pixel circuit PXi(j+1) of FIG. 5 in that the single initialization voltage of the second pixel circuit PXi(j+1) is set as the second initialization voltage source VINT2.

Unlike FIG. 5, since the capacitor Co2 of the second organic light emitting diode OLED2 is pre-charged with a voltage equal to that of the capacitor Co1 of the first organic light emitting diode OLED1, there is no more useful effect according to the pre-charged voltage.

However, in this embodiment, the second initialization voltage source VINT2 is connected to the gate terminal of the second driving transistor M1' of the second pixel circuit PXi(j+1) in the first initialization period. As described above, the second initialization voltage of the second initialization voltage source VINT2 is less than the first initialization voltage of the first initialization voltage source VINT1. In addition, the voltage of the voltage source ELVDD may be greater than the first and second initialization voltages.

Therefore, the difference between the gate and source voltages of the second driving transistor M1', which is set in the first initialization period, is greater than that between the gate and source voltages of the first driving transistor M1. Thus, the on-bias voltage of the second driving transistor M1' is greater than that of the first driving transistor M1. The inventor of the embodiments described herein has found that there is an effect that, when the on-bias voltage increases, driving current increases as emission time elapses.

FIG. 8 illustrates an example of a characteristic curve CC1 of the second driving transistor M1' at time t5 of FIG. 6, e.g., at the time when the emission period is started. The characteristic curve of a transistor may represent the magnitude ID (A) of driving current according to the difference VGS (V) in voltage between gate and source voltages of the transistor. The level CL1 of driving current flowing when a voltage PT1 corresponding to an arbitrary gray scale is applied to the second driving transistor M1' is indicated by a straight line.

As time elapses in the emission period, the characteristic curve moves to the right. The degree of movement to the right may be in proportion to an increment of the on-bias voltage.

An example of the characteristic curve CC2 after 16 ms elapses in the emission period is illustrated in FIG. 8. It can be seen that the absolute value of a voltage PT2 has been slightly decreased due to a decrease in quantity of maintenance charges of the storage capacitor Cst1', but the level CL2 of driving current after 16 ms elapses has been increased because the characteristic curve CC2 is moved to the right as compared with the characteristic curve CC1.

Thus, in the embodiment of FIG. 7, as the amount of driving current in the emission period of the second pixel circuit PXi(j+1) increases, the emission time of the second organic light emitting diode OLED2 may be brought forward, or the emission luminance of the second organic light emitting diode OLED2 may be increased. Thus, according to the embodiment of FIG. 7, the color dragging phenomenon described in FIG. 4 may also be removed.

Figure 9:
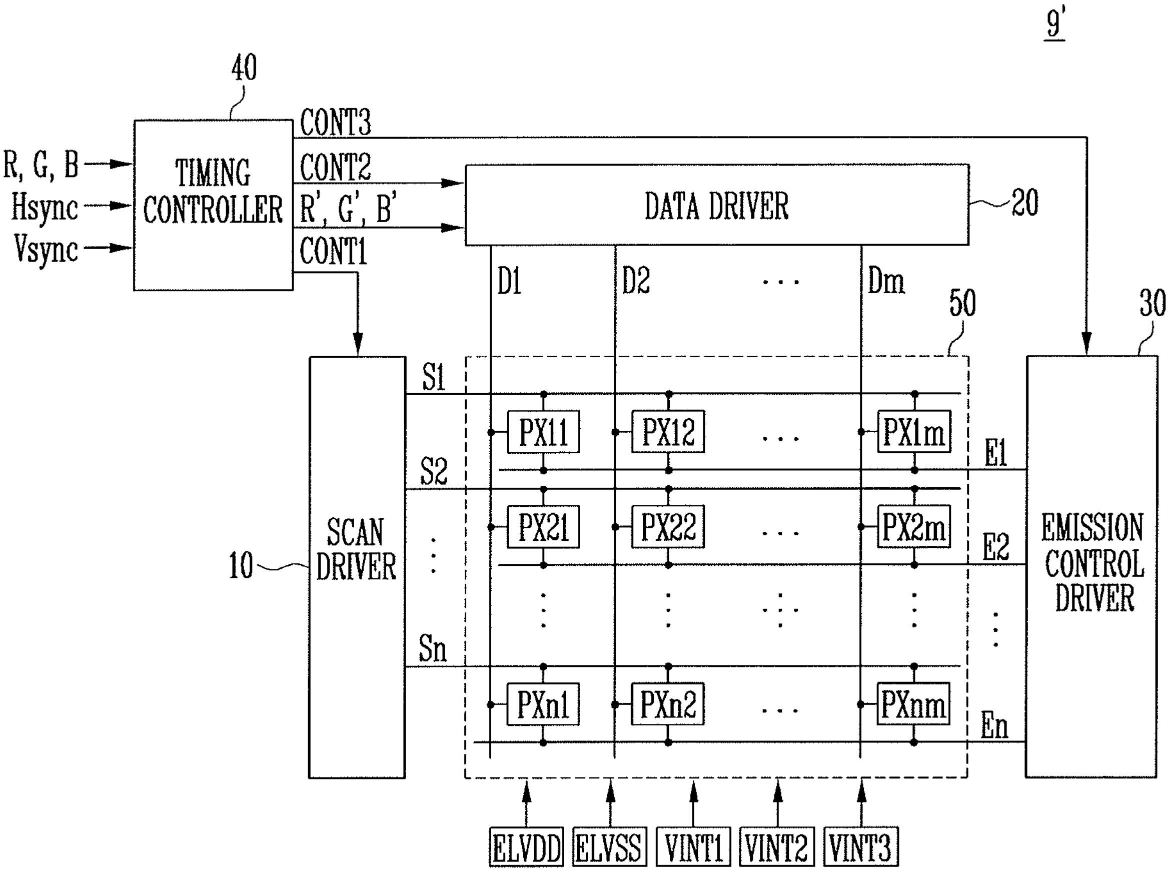
FIG. 9 illustrates another embodiment of a display device.
Figure 10:
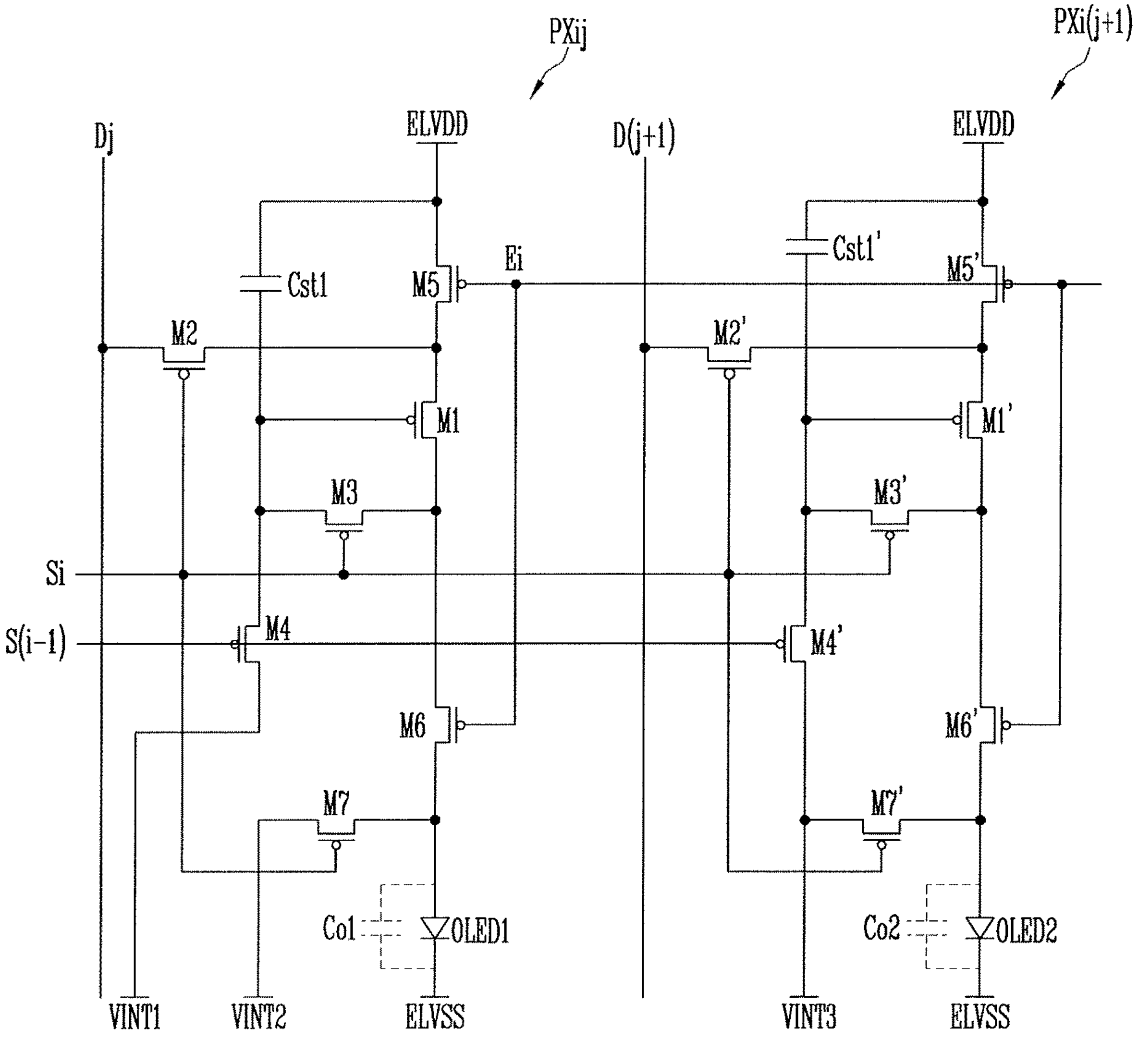
FIG. 10 illustrates another embodiment of a pixel circuit.

FIG. 9 illustrates another embodiment of a display device 9'. FIG. 10 illustrates another embodiment of a pixel circuit, to which an initialization voltage source is coupled. The display device 9' of FIG. 9 is different from the display device 9 of FIG. 1, in that the display device 9' further includes a third initialization voltage source VINT3. The third initialization voltage source VINT3 is coupled as a single initialization voltage source to the second pixel circuit PXi(j+1). The configuration of the display device 9' may be equal to that of the display device 9.

Referring to FIG. 10, in the second pixel circuit PXi(j+1), the third initialization voltage source VINT3 is coupled to the anode of the second organic light emitting diode OLED2 through the transistor M7' and is coupled to the gate terminal of the second driving transistor M1'. In this embodiment, a third initialization voltage of the third initialization voltage source VINT3 is different from the first and second initialization voltages. In an embodiment, the third initialization voltage may be a voltage between the first and second initialization voltages. For example, when the first initialization voltage is −2 V and the second initialization voltage is −5 V, the third initialization voltage may be −4 V.

Under some circumstances, it may be disadvantageous to include an additional voltage source (different from the first initialization voltage source VINT1 and the second initialization voltage source VINT2). However, any such disadvantages may be offset by the advantages realized by the embodiments of FIG. 5 and FIG. 7.

For example, since the capacitor Co2 of the second organic light emitting diode OLED2 is pre-charged with a voltage greater than that of the capacitor Co1 of the first organic light emitting diode OLED1, the emission time of the second organic light emitting diode OLED2 may be brought forward.

Further, since the difference between the gate and source voltages of the second driving transistor M1' is greater than that between the gate and source voltages of the first driving transistor M1, the on-bias voltage is increased. Accordingly, as the driving current increases as time elapses in the emission period, the emission time of the second organic light emitting diode OLED2 may be brought forward or the emission luminance of the second organic light emitting diode OLED2 may be increased.

Figure 11:
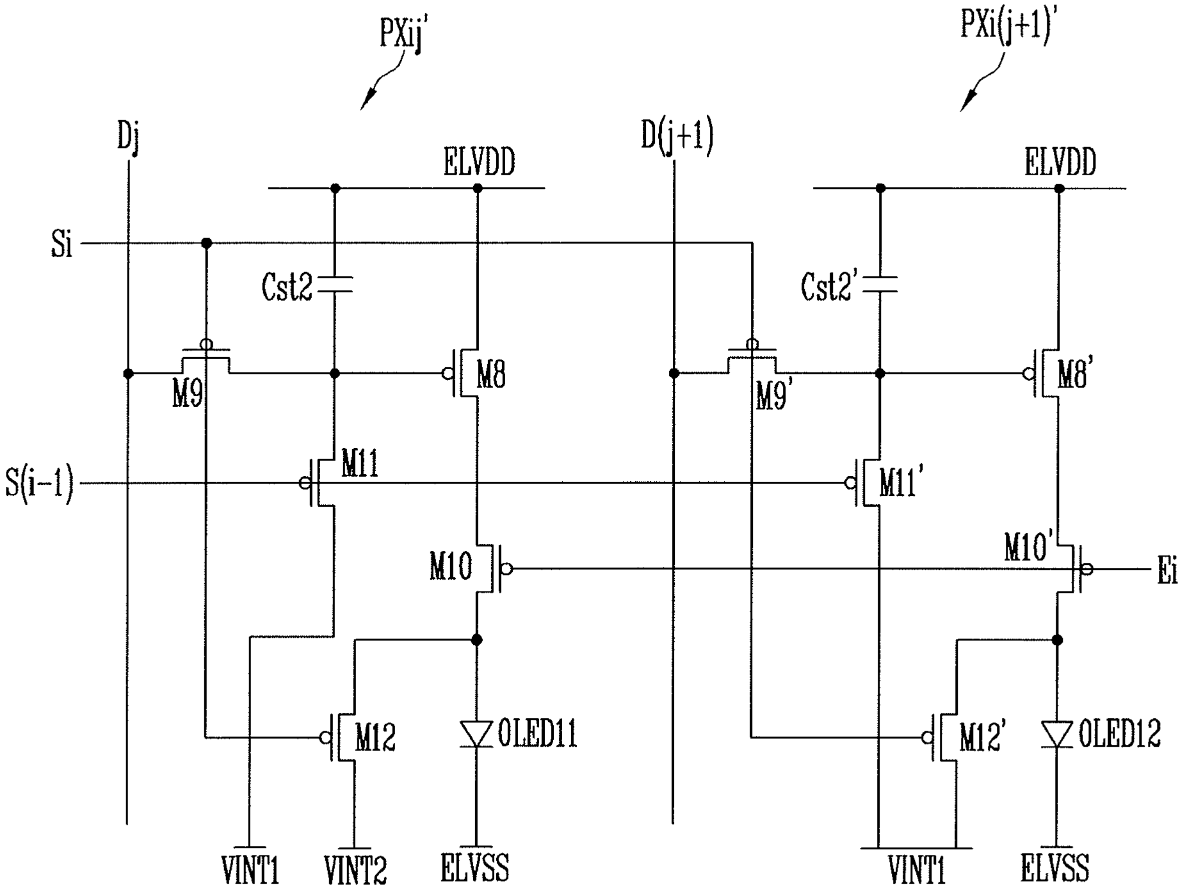
FIG. 11 illustrates another embodiment of a pixel circuit.

FIG. 11 illustrates an example where the embodiment of FIG. 5 is applied to another pixel circuit. Referring to FIG. 11, a first pixel circuit PXij' includes a plurality of transistors M8, M9, M10, M11, and M12, a storage capacitor Cst2, and a first organic light emitting diode OLED11. In addition, a second pixel circuit PXi(j+1)' includes a plurality of transistors M8', M9', M10', M11', and M12', a storage capacitor Cst2', and a second organic light emitting diode OLED12. The structure of the second pixel circuit PXi(j+1)' is substantially identical to that of the first pixel circuit PXij' except a data line, an initialization voltage source, and an organic light emitting diode. Therefore, only the first pixel circuit PXij' will be described below.

The transistor M8 has one end coupled to an end of the transistor M10, another end coupled to a voltage source ELVDD, and a gate terminal coupled to an end of the transistor M9. The transistor M8 may serve as a first driving transistor.

The transistor M9 has one end coupled to a first data line Dj, another end coupled to the gate terminal of the transistor M8, and a gate terminal coupled to a scan line Si of a current stage.

The transistor M10 has one end coupled to the first organic light emitting diode OLED11, another end coupled to the one end of the transistor M8, and a gate terminal coupled to an emission control line Ei. The transistor M10 may serve as an emission control transistor.

The transistor M11 has one end coupled to a first initialization voltage source VINT1, another end coupled to one end of the storage capacitor Cst2, and a gate terminal coupled to a scan line S(i−1) of a previous stage.

The transistor M12 has one end coupled to a second initialization voltage source VINT2, another end coupled to the first organic light emitting diode OLED11, and a gate terminal coupled to the scan line Si of the current stage.

The storage capacitor Cst2 has one end coupled to the gate terminal of the transistor M8 and another end coupled to the voltage source ELVDD.

The first organic light emitting diode OLED11 has an anode coupled to an end of the transistor M12 and a cathode coupled to a voltage source ELVSS.

Control signals of the pixel circuits PXij' and PXi(j+1)' of FIG. 11 may be identical to those of the pixel circuits PXij and PXi(j+1) of FIG. 5.

Like the embodiment of FIG. 5, in the embodiment of FIG. 11, the single initialization voltage source is also the first initialization voltage source VINT1. Since a capacitor of the second organic light emitting diode OLED12 is pre-charged with a voltage greater than that of a capacitor of the first organic light emitting diode OLED11, the emission time of the second organic light emitting diode OLED12 in the emission period after the second initialization period may be further brought forward.

Figure 12:
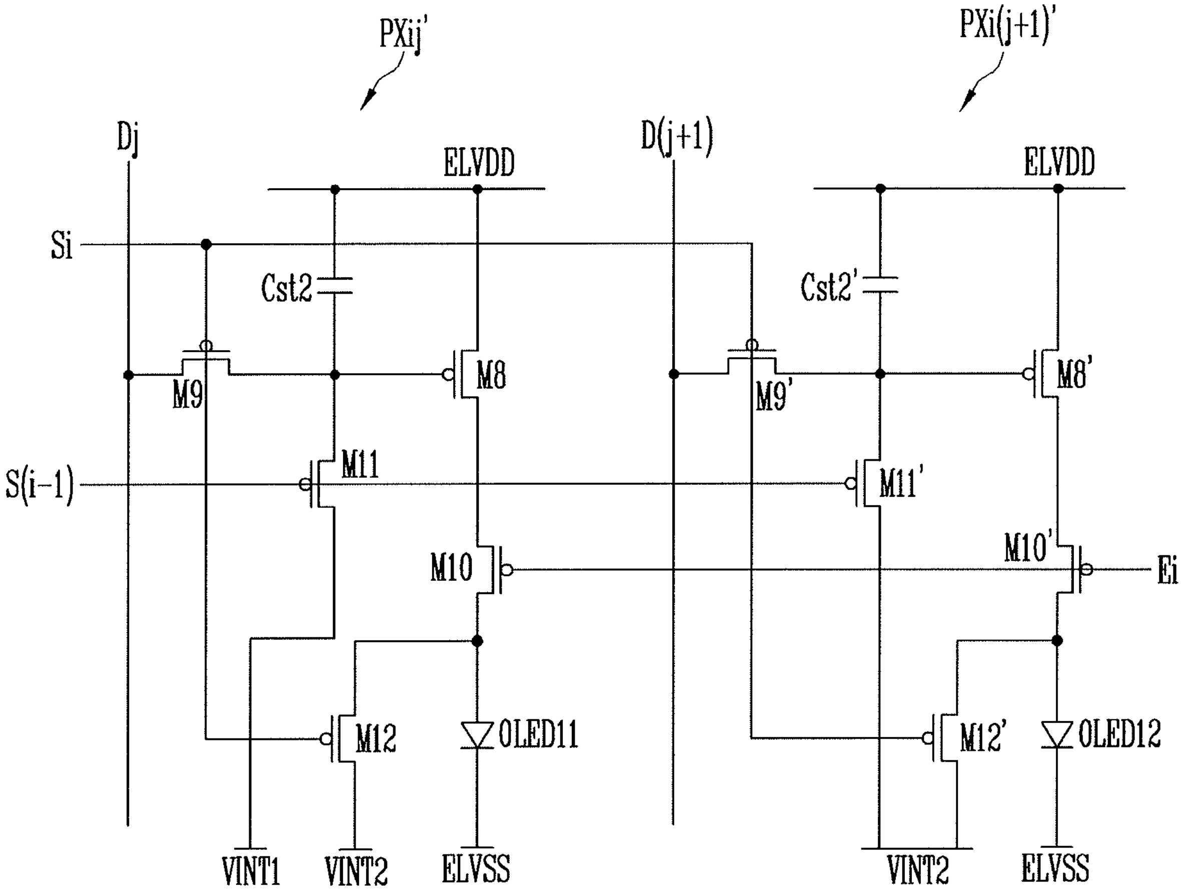
FIG. 12 illustrates another embodiment of a pixel circuit.

FIG. 12 illustrates an example of a case where the embodiment of FIG. 7 is applied to another pixel circuit. The embodiment of FIG. 12 is different from that of FIG. 12 in that the single initialization voltage source is the second initialization voltage source VINT2. The other components of FIG. 12 may be identical to those of FIG. 11.

Like the embodiment of FIG. 7, in the embodiment of FIG. 12, the single initialization voltage source is the second initialization voltage source VINT2. As the amount of driving current increases in the emission period of the second pixel circuit PXi(j+1)', the emission time of the second organic light emitting diode OLED12 may be brought forward, or the emission luminance of the second organic light emitting diode OLED12 may be increased.

Figure 13:
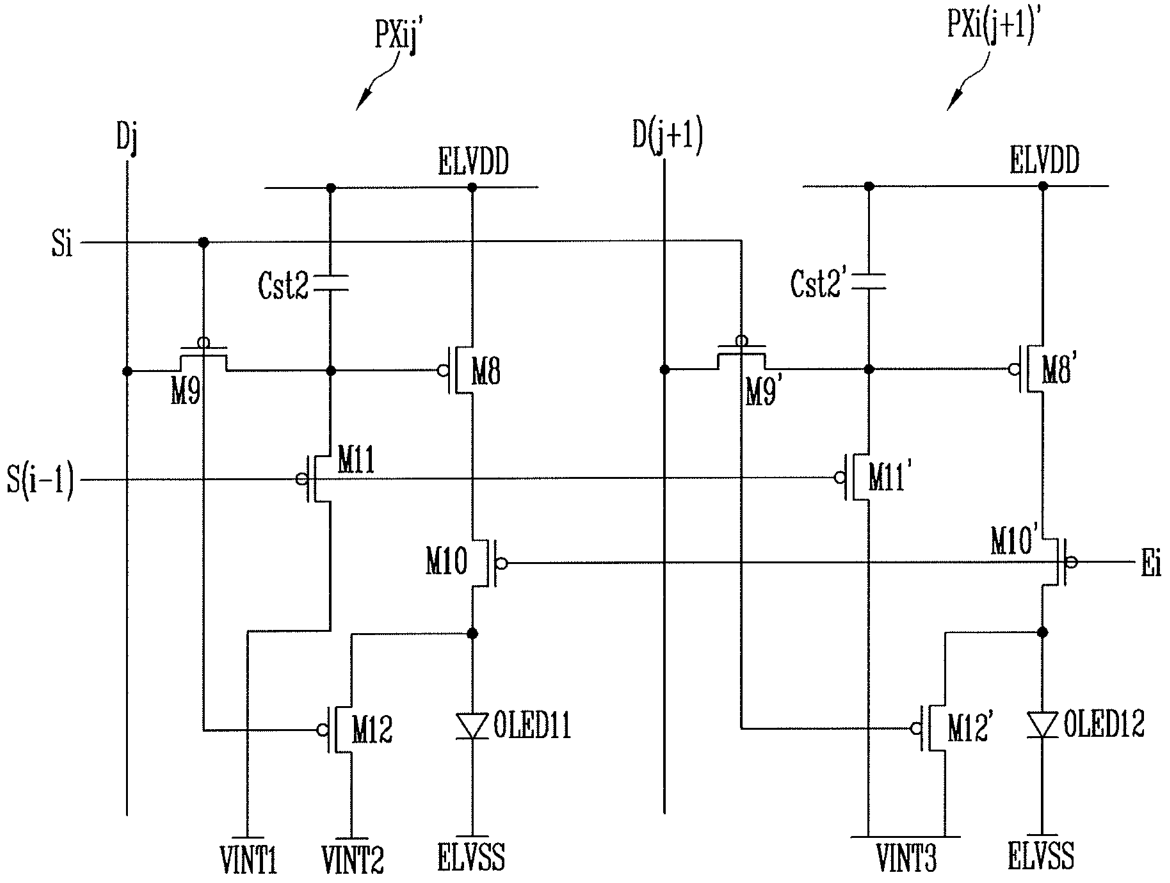
FIG. 13 illustrates another embodiment of a pixel circuit.

FIG. 13 illustrates an example of a case where the embodiment of FIG. 10 is applied to another pixel circuit. The embodiment of FIG. 13 is different from that of FIG. 11 in that the single initialization voltage source is the third initialization voltage source VINT3. The other components of FIG. 13 may be identical to those of FIG. 11.

Like the embodiment of FIG. 10, in the embodiment of FIG. 13, the single initialization voltage source is also the third initialization voltage source VINT3. Under some circumstances, it may be disadvantageous to include an additional voltage source (different from the first initialization voltage source VINT1 and the second initialization voltage source VINT2). However, any such disadvantage may be offset by advantages of the embodiment of FIG. 11 and advantages of the embodiment of FIG. 12.

Thus, since the capacitor of the second organic light emitting diode OLED12 is pre-charged with a voltage greater than that of the capacitor of the first organic light emitting diode OLED11, the emission time of the second organic light emitting diode OLED12 may be brought forward.

Further, since the difference between gate and source voltages of the second driving transistor M8' is greater than that between gate and source voltages of the first driving transistor M8, the on-bias voltage is increased. Accordingly, as the driving current increases as time elapses in the emission period, the emission time of the second organic light emitting diode OLED12 may be brought forward, or the emission luminance of the second organic light emitting diode OLED12 may be increased.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

The controllers, drivers, and other signal generating and processing features of the embodiments disclosed herein may be implemented in non-transitory logic which, for example, may include hardware, software, or both. When implemented at least partially in hardware, the controllers, drivers, and other signal generating and processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, drivers, and other signal generating and processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods herein.

In accordance with one or more of the aforementioned embodiments, a display device including a pixel circuit and a driving method may be provided with a structure that removes a color dragging phenomenon.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. A display device, comprising:
- a first initialization voltage source to provide a first initialization voltage;
- a second initialization voltage source to provide a second initialization voltage having a voltage value different from a voltage value of the first initialization voltage;
- a first pixel circuit including a first light emitting diode for a first color and a first driving transistor; and
- a second pixel circuit including a second light emitting diode for a second color different from the first color and a second driving transistor,
- wherein a gate terminal of the first driving transistor is coupled to the first initialization voltage source during a first initialization period,
- wherein a gate terminal of the second driving transistor is coupled to the second initialization voltage source during the first initialization period, and
- wherein the second initialization voltage is set less than the first initialization voltage in response to the second light emitting diode having a greater capacitance per unit area than the first light emitting diode.

2. The display device as claimed in claim 1, wherein:
- the first driving transistor has an end coupled to an anode of the first light emitting diode in an emission period, and
- the second driving transistor has an end coupled to an anode of the second light emitting diode in the emission period.

3. The display device as claimed in claim 2, wherein:
- the second initialization voltage source is coupled to the anode of the first light emitting diode in a second initialization period, and
- the second initialization voltage source is coupled to the anode of the second light emitting diode in the second initialization period.

4. The display device as claimed in claim 3, wherein the first initialization period is before the second initialization period.

5. The display device as claimed in claim 1, further comprising:
- a third pixel circuit coupled to the first initialization voltage source, the third pixel circuit including a third light emitting diode for a third color different from the first color and the second color;
- a first data line; and
- a second data line different from the first data line, wherein the first pixel circuit and the third pixel circuit are coupled to the first data line and wherein the second pixel circuit is coupled to the second data line.

6. The display device as claimed in claim 5, wherein:
- the first light emitting diode is a red light emitting diode,
- the second light emitting diode is a green light emitting diode, and
- the third light emitting diode is a blue light emitting diode.

7. The display device as claimed in claim 5, wherein:
- the first light emitting diode is a red light emitting diode,
- the second light emitting diode is a blue light emitting diode, and
- the third light emitting diode is a green light emitting diode.

8. The display device as claimed in claim 5, wherein the first light emitting diode is a blue light emitting diode,
- the second light emitting diode is a red light emitting diode, and
- the third light emitting diode is a green light emitting diode.

9. The display device as claimed in claim 5, wherein:
- the third pixel circuit includes a third driving transistor having an end coupled to an anode of the third light emitting diode in an emission period, and
- the first initialization voltage source is coupled to a gate terminal of the third driving transistor in a second initialization period.

10. A display device, comprising:
- a first initialization voltage source to provide a first initialization voltage;
- a second initialization voltage source to provide a second initialization voltage having a voltage value different from a voltage value of the first initialization voltage;
- a plurality of first pixel circuits, each of the first pixel circuits including a first light emitting diode for a first color and a first driving transistor; and
- a plurality of second pixel circuits, each of the second pixel circuits including a second light emitting diode for a second color different from the first color and a second driving transistor,
- a plurality of third pixel circuits, each of the third pixel circuits including a third light emitting diode for a third color different from the first color and the second color and a third driving transistor,
- wherein, in a first pixel column, the plurality of first pixel circuits and the plurality of third pixel circuits are alternately connected to a first data line,
- wherein, in a second pixel column, the plurality of second pixel circuits are connected to a second data line adjacent to the first data line,
- wherein the first initialization voltage source is provided for the first pixel column,
- wherein the second initialization voltage source is provided for the second pixel column,
- wherein a gate terminal of the first driving transistor is coupled to the first initialization voltage source during a first initialization period,
- wherein a gate terminal of the second driving transistor is coupled to the second initialization voltage source during the first initialization period, and
- wherein a gate terminal of the third driving transistor is coupled to the first initialization voltage source during a first initialization period.

11. The display device as claimed in claim 10, wherein
- the first driving transistor has an end coupled to an anode of the first light emitting diode in an emission period,
- the second driving transistor has an end coupled to an anode of the second light emitting diode in the emission period, and
- the third driving transistor has an end coupled to an anode of the third light emitting diode in the emission period.

12. The display device as claimed in claim 10, wherein
- the first light emitting diode is a red light emitting diode,
- the second light emitting diode is a green light emitting diode, and
- the third light emitting diode is a blue light emitting diode.

* * * * *